Feb. 1, 1927.                     1,616,380
J. F. LUCAS
HOISTING DEVICE
Filed Feb. 24, 1926      3 Sheets-Sheet 2

J. F. Lucas
INVENTOR
BY Victor J. Evans
ATTORNEY

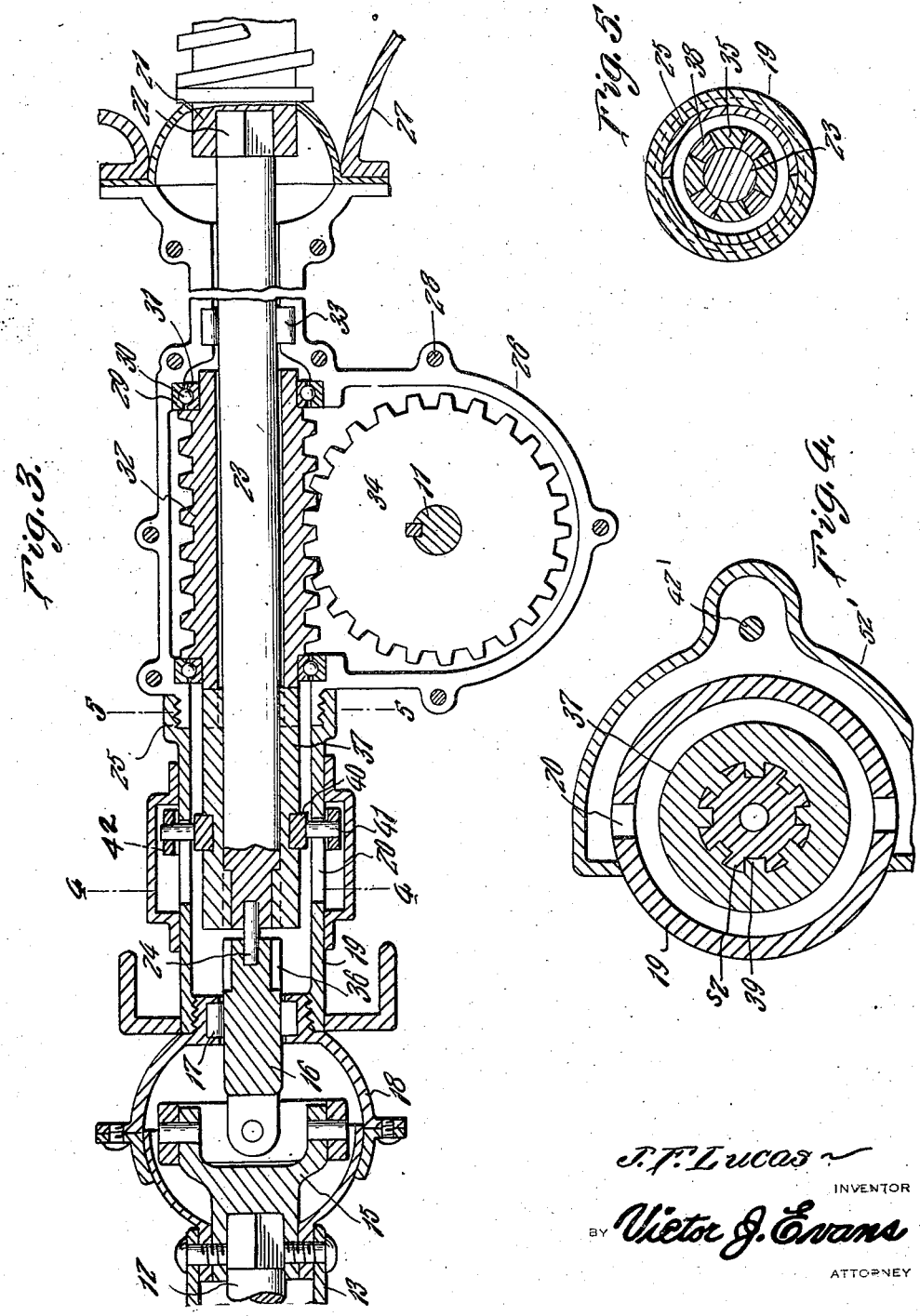

Patented Feb. 1, 1927.

1,616,380

UNITED STATES PATENT OFFICE.

JOHN F. LUCAS, OF KINSMAN, OHIO.

HOISTING DEVICE.

Application filed February 24, 1926. Serial No. 90,391.

My present invention has reference to trucks of the class provided with the pivotally supported dump bodies and my object is the provision of means operated directly by the engine of the truck for swinging the body to dumping position.

A further object is the provision of a means for this purpose which can be readily attached to the chassis, and engine of any small type of trucks, and especially to that type known to the trade as Ford trucks.

A still further object is to arrange between the drive and driven shafts of an automobile engine an auxiliary shaft which is at all times connected to the drive shaft, and on which there is a slidable collar for clutching engagement with the driven shaft when both of these shafts are to be turned in unison, and also wherein the declutching of the shafts will permit the engine shaft to drive drums having cables wound therearound and which are trained over pulleys on an upright and are connected to the forward end of the truck body, and whereby the said body can be thus swung to dumping position.

To the attainment of the foregoing broadly stated objects and many others which will appear as the nature of the invention is better understood, the improvement further consists in certain novel features of construction, combination and operative association of parts, a satisfactory embodiment of which is illustrated by the accompanying drawings.

In the drawings:

Figure 3 is a greatly enlarged sectional view approximately on the line 3—3 of Figure 2.

Figure 4 is a sectional view on the line 4—4 of Figure 3.

Figure 5 is a sectional view on the line 5—5 of Figure 3.

Figure 1:
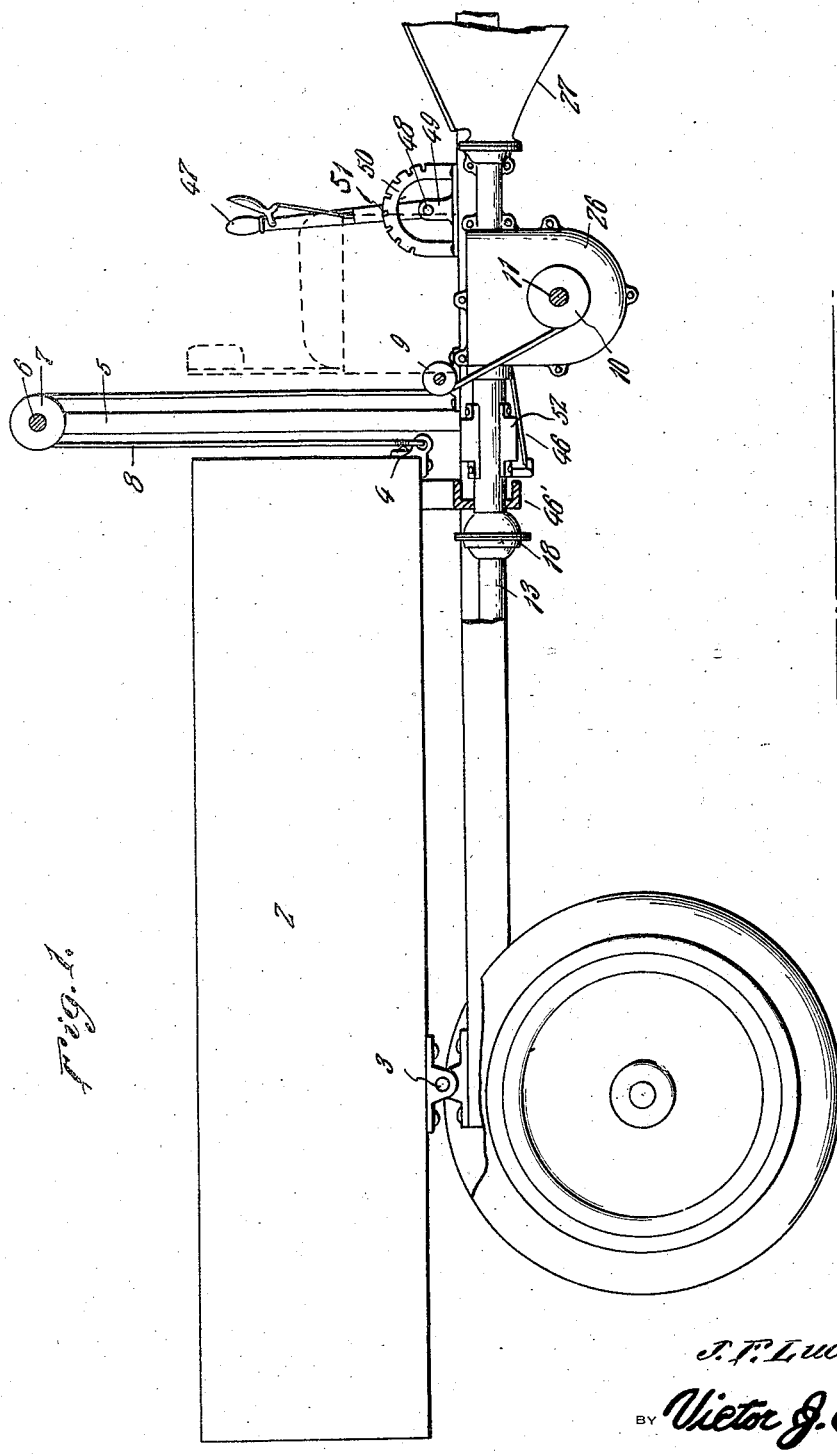
Figure 1 is a side elevation illustrating the application of my improvement, parts being broken away.
Figure 2:
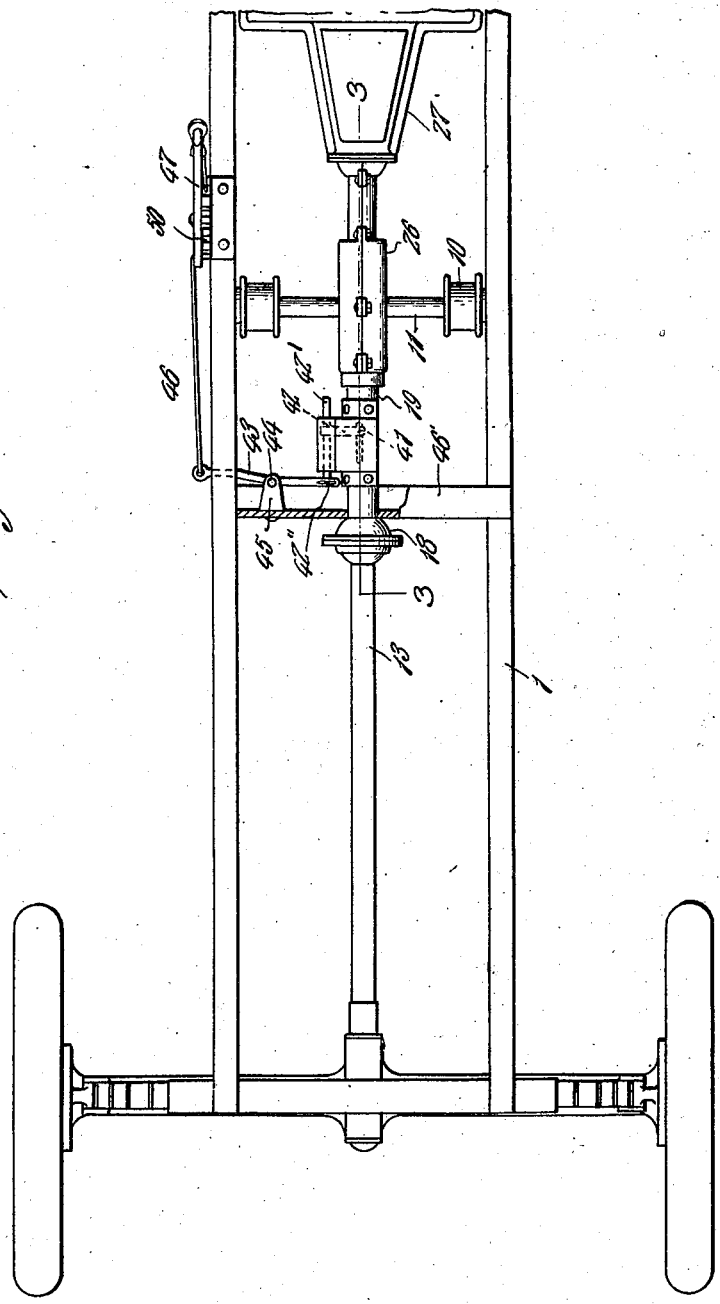
Figure 2 is a top plan view of a portion of the truck chassis sufficient to illustrate my improvement thereon.

Referring now to the drawings in detail, the numeral 1 designates the chassis of an ordinary truck, and 2 the dumping body which is pivotally supported beyond its center, as at 3, on the chassis. The truck body 2, at the forward and lower corner thereof, has secured thereon eye carrying brackets 4, while mounted on the chassis, directly forward of the said end of the truck body there are the uprights of a frame 5. The frame has a shaft 6 at the upper portion thereof and journalled on this shaft there are grooved wheels 7. A strong flexible element or cable 8 is secured to each of the brackets 4 and is trained over the grooved wheels 7. The cables 8 are also trained over grooved wheels or pulleys 9 that have their shafts journaled in suitable bearings supported on the side members of the chassis and from thence are trained around and secured on drums 10 that are fixed on a shaft 11 supported in a manner which will presently be described, below the chassis.

The axle drive shaft 12 is encased in the usual housing 13 and has at its forward end the usual universal joint 15. The joint is, of course, suitably housed. In the present instance, the outer or forward joint section has associated therewith a stub shaft 16, the said shaft revolving around roller bearings 17 provided in a raceway in the outer end of the front housing section 18 for the universal joint.

The hub end of the joint housing section 18 is threaded and has screwed thereon a tubular member 19. This end of the tubular member 19 is received in a bearing opening in one of the cross beams of the chassis and is provided upon its upper and lower faces with aligning longitudinal openings 20.

The engine drive shaft is indicated by the numeral 21, and in the socket end thereof there is received the squared end 22 of a shaft member 23. The shaft is in alignment with the stub shaft 16, but is not in contact therewith, there being, however, a loose connection between these shafts. This connection is preferably in the nature of a pin or short shaft 24 which is centrally let in both the stub shaft 16 and the shaft 23.

The forward end of the tubular housing 19 is offset and formed with interior threads to engage the threaded ends 25 on a two-part housing 26. The housing has its upper portion rounded to correspond to the shape of the tubular member or housing 19 and its forward end is bolted or otherwise secured to the outer end of the transmission casing 27 through which the engine shaft 21 extends. The sections comprising the housing 26 have at their confronting ends outstanding ears and lugs through which are passed securing means, such as bolts 28 which are engaged by the usual nuts. The tubular portion of the housing has annular depressions for the outer elements 29 of race-ways for antifrictional balls 30, the inner elements of the said raceways, indicated by the numeral 31, being carried on the reduced and shouldered end of a worm screw 32. The housing 26 is also provided with a race-way for anti-frictional rollers 33 that engage the shaft 23.

The drum shaft 11 is journaled in bearing openings in the sides of the lower portion of the housing 26 and the said shaft has fixed thereon a worm wheel 34 which is received in the housing 26, and which is in mesh with the worm screw 32.

What I will term the rear end of the worm screw 32, that is, the end thereof nearest the driven shaft 12, is formed with a clutch surface provided by notching the said worm screw and forming fingers 35 between said notches. The forward end of the stub shaft 16 is likewise notched, as at 36. Slidable on the shaft 23, between the worm screw 32 and the stub shaft 16 there is a clutch sleeve 37. Both ends of this sleeve are notched to provide spaced fingers 38 and 39. The clutch sleeve 37 has an angle groove therethrough, in which is seated a ring member 40 provided with stub shafts 41 that pass through the respective openings 20. These stub shafts 41 and received through the ends of a yoke 42, the said yoke being fixed on an arm 42′, one of whose ends is provided with pins 42″ that are received through an elongated slot in one end of the angle lever 43. In order to prevent the entrance of dirt and other foreign matter through the rod 42′, the yoke 42 and through the openings 20 there is secured on the housing 19 a protector casing 52′. The lever is pivoted, as at 44, on a supporting bracket 45 fixed to the transverse brace member 46′ of the chassis. The outer end of the lever 43 is extended beyond one side of the frame or chassis and has secured thereto a rod, or if desired, a flexible element, 46 which in turn is secured to the lower end of a lever 47. This lever is pivotally supported, as at 48, on a bracket 49 that extends from the base of a segmental rack 50, the said rack being fixedly secured to one of the side members of the chassis. The lever 47 carries a handle operated spring influenced dog or detent 51 to engage with the teeth of the rack 50.

The end of the shaft 23, nearest the stub shaft 16, is formed with spaced longitudinal grooves that provide fingers 52 therebetween and these grooves are at all times engaged by the fingers 39 on the clutch sleeve 37. When the parts are in the position illustrated in Figure 3 of the drawings, the lever 47 has been swung to move the clutch sleeve 37 out of clutching engagement with the stub shaft 16, thereby bringing the said clutch sleeve in clutching engagement with the worm screw 32. The clutch sleeve, as stated, is at all times locked to the shaft 23 but the said shaft is not in contacting engagement with the bore of the worm screw 32. Thus while the engine is still in motion the drive shaft is disconnected therefrom, and the worm is revolved to turn the worm wheel which imparts motion to the drum 10 to wind the cables 8 thereon and thereby raise the truck body 2 to a desired angle to cause the contents to gravitate therefrom. The cable may be again wound on the drums, when the body is returned to normal position by shifting the gears in the usual manner, to reverse the turning of the shafts 21 and 23, when the drive shaft is still declutched. The anti-frictional elements 30 compensate for any end thrust on the worm and likewise provide anti-frictional bearings on which the said worm turns. The anti-frictional rollers 17 and 33 insure the free turning of the universal housing and the shaft 23 in the housing 26 and it is believed that the foregoing description when carefully read in connection with the accompanying drawings, will fully set forth the construction and advantages of my improvement.

Having described the invention, I claim:—

1. The combination with a motor driven truck having a pivotally supported body thereon, of a means for swinging the body to dumping position by the operation of the motor of the truck, said means including a stub shaft having a clutch surface, which is connected to the universal joint associated with the axle drive shaft, an auxiliary shaft connected to the motor shaft, in a line with but out of contact with the stub shaft, means, comprising a pin, entering the confronting ends of the auxiliary and the stub shafts for holding the same in alignment, a clutch sleeve having a spline engagement with the auxiliary shaft and arranged for movement over one end thereof, a worm screw out of contact with and journaled around the stub shaft, combined thrust and anti-frictional bearings for the worm screw, anti-frictional bearings for the stub shaft and for the auxiliary shaft, a worm wheel meshing with the worm screw, drum means on the shaft of the worm screw, flexible elements secured to and wound around said drums, elevated guide means for the flexible elements and said elements having one of their ends connected to the front of the dump body, and lever operated means for moving the clutch sleeve to bring the same into clutching engagement with the worm screw, or into clutching engagement with the stub shaft when the said sleeve has been moved away from the worm screw.

2. The combination with a motor driven truck having a pivotally supported dump body thereon, of a means for dumping the body by the operation of the motor shaft, said means comprising a clutch carrying stub shaft associated with the axle drive shaft of the motor, a housing therefor, anti-frictional bearings between the housing and stub shaft, an auxiliary shaft connected directly to the motor shaft, means comprising a pinion received in the confronting ends of the auxiliary and the stub shafts for holding these shafts in alignment but out of contact with each other, a clutch sleeve having a spline engagement with the auxiliary shaft and movable over one end of said shaft, a worm screw received around but out of contact with the auxiliary shaft, anti-frictional bearings between the housing and the auxiliary shaft, combined thrust and anti-frictional bearings for the worm screw, a worm wheel in mesh with the worm screw, drums on the shaft of the worm wheel, cables wound around and secured to the respective drums, lower guide wheels for the cables, a frame supported on the truck chassis, grooved guide wheels on the upper portion of said frame over which the cables are trained, eye carrying brackets on the lower and forward corners of the body to which the cables are connected, a lever, means operated by the lever for sliding the clutch sleeve to bring the same into clutching engagement with the worm screw or to bring the same into clutching engagement with the stub shaft when away from the worm screw, and means for locking the lever from movement when the clutch sleeve is in either of its said positions.

In testimony whereof I affix my signature.

JOHN F. LUCAS.